US007925841B2

(12) United States Patent
Rao

(10) Patent No.: US 7,925,841 B2
(45) Date of Patent: Apr. 12, 2011

(54) MANAGING SHARED MEMORY USAGE WITHIN A MEMORY RESOURCE GROUP INFRASTRUCTURE

(75) Inventor: Anil Rao, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 412 days.

(21) Appl. No.: 10/939,047

(22) Filed: Sep. 10, 2004

(65) Prior Publication Data

US 2006/0059318 A1 Mar. 16, 2006

(51) Int. Cl.
G06F 13/00 (2006.01)
(52) U.S. Cl. ......... 711/147; 711/170; 711/171; 711/173
(58) Field of Classification Search .................. 711/147, 711/170, 171, 173
See application file for complete search history.

(56) References Cited

U.S. PATENT DOCUMENTS

| 5,950,221 | A | 9/1999 | Draves et al. | |
|---|---|---|---|---|
| 6,789,256 | B1 * | 9/2004 | Kechriotis et al. | 719/312 |
| 2002/0133530 | A1 * | 9/2002 | Koning | 709/102 |
| 2003/0101324 | A1 | 5/2003 | Herr et al. | |
| 2003/0200398 | A1 | 10/2003 | Harris | |
| 2006/0059323 | A1 | 3/2006 | Rao | |

OTHER PUBLICATIONS

U.S. Appl. No. 10/939,052, Final Rejection dated Nov. 13, 2009, pp. 1-10.
U.S. Appl. No. 10/939,052, Non-Final Rejection dated Apr. 6, 2009, pp. 1-8 and attachments.
U.S. Appl. No. 10/939,052, Final Rejection dated Jul. 11, 2008, pp. 1-13.
U.S. Appl. No. 10/939,052, Non-Final Rejection dated Dec. 14, 2007, pp. 1-12.
U.S. Appl. No. 10/939,052, Final Rejection dated Jul. 2, 2007, pp. 1-11.
U.S. Appl. No. 10/939,052, Non-Final Rejection dated Nov. 1, 2006, pp. 1-10 and attachments.

* cited by examiner

Primary Examiner — Sanjiv Shah
Assistant Examiner — Jae U Yu

(57) ABSTRACT

A method for allocating memory associated with a local shared memory segment to facilitate execution of a first process. The method includes automatically allocating memory associated with a first MRG to the local shared memory segment if the local shared memory segment is created by the first process. The first MRG is associated with a first local shared affiliation that involves the first process. The method also includes automatically allocating memory associated with a second MRG to the local shared memory segment if the local shared memory is created by a second process different from the first process. The second MRG is associated with a second local shared affiliation that involves a second process.

20 Claims, 7 Drawing Sheets

MRG_CREATE

MRG_REMOVE

MRG_GET_ATTR

MRG_SET_ATTR

MRG_GET_PROC_AFF

MRG_SET_PROC_AFF

MRG_GET_OBJ_AFF

MRG_SET_OBJ_AFF

MRG_NUM_OBJ

MRG_GET_STATS

FIG. 7

MANAGING SHARED MEMORY USAGE WITHIN A MEMORY RESOURCE GROUP INFRASTRUCTURE

BACKGROUND OF THE INVENTION

In a computer system, such as a server, multiple processes may be running concurrently. These processes share the physical memory of the computer system for their memory needs. With reference to FIG. 1A, processes 102, 104, 106, 108, and 110 all share the memory space 112 of the computer system. If the total amount of memory required by the concurrently executing processes is less than the total physical memory available, each process can execute without experiencing memory access related delays. On the other hand, if the total amount of memory required exceeds the total amount of memory available, memory paging occurs in order to ensure that all processes have sufficient memory to execute.

Paging, as is known, involves swapping the contents of physical memory into and out of disk-based storage, such as a hard drive to extend the logical memory available to a process. Because the memory access speed for disk-based storage is significantly slower than for semiconductor-based storage, paging affects the execution speed of the process being paged.

In some cases, it is desirable to guarantee a certain amount of physical memory to a process or a group of processes. In the prior art, different approaches have been taken to ensure that a process or a group of processes has a guaranteed amount of physical memory during execution. The brute force approach involves having a process lock down a certain amount of physical memory, which may then only be used by that particular process. Although this approach ensures that the process will have a guaranteed amount of physical memory, it is inefficient since other processes cannot utilize memory that is locked even if the process that locks down that memory does not truly need all of it at all times for its execution. Secondly, memory locking is a privileged operation that is not available to ordinary applications.

Another approach based on the external page-cache management scheme lets processes have direct control over their share of physical memory through special primitives provided by the operating system. A sophisticated application can exploit this feature to implement a dedicated memory management policy that best suits its requirements. However, this approach is not backward compatible with existing applications since a legacy application may not be aware of such primitives and would be at a disadvantage when executing in an environment wherein other applications directly control their physical memory requirements.

Another approach involves using a special application program to manage physical memory consumption. This program, known as the Resource Manager, queries the operating system periodically to determine the amount of physical memory being used by every process on the system. When the available memory on the system is low the Resource Manager picks processes that are exceeding their share and tries to force them to shrink in size. This is achieved by stopping the selected processes via signals and process priority changes and then relying on the system memory pager to reclaim non-recently referenced pages of physical memory. In this form of control all of the necessary logic is implemented by the Resource Manager program, a user application, and does not require any modifications to the operating system. However, it is not very deterministic and problems can arise, for instance, if a target process has set up its own signal handlers to ignore signals sent from the Process Resource Manager.

Memory resource grouping represents another approach to address the physical memory control issue. In memory resource grouping, the physical memory is divided into logical blocks called MRGs. Referring now to FIG. 1B, processes 130, 132, and 134 are assigned to MRG 136 of a computer system 150, while processes 138 and 140 are assigned to MRG 142. In dividing the physical memory space into MRGs, the memory utilization of processes associated with one MRG does not impact the memory utilization in another MRG. For example, even if processes 138 and 140 each requires a vast amount of memory and thus a lot of paging activities need to be performed with respect to the memory assigned to MRG 142, the amount of memory available to MRG 136 is not affected. Thus memory resource grouping is a way to provide memory isolation to a group of processes.

Memory resource grouping also has other advantages. A MRG (such as MRG 136) can be set up to import from another MRG or export memory to another MRG. This form of controlled sharing allows the resources of an under-utilized MRG (that is willing to export) to be used by an over-loaded MRG (that has import capability), leading to higher overall physical memory utilization on the computer system.

Unfortunately, memory resource grouping has only been applied thus far to private memory of processes. To further explain this issue, FIG. 2 shows the various memory resource types that may exist in physical memory. With reference to FIG. 2, physical memory may involve kernel memory 202, and user resource types 204. User resource types 204 include process private memory 206, local shared memory 208, and global shared memory 210 (which includes shared text memory 210A and shared library memory 210B).

Kernel memory refers to the memory used by the operating system kernel. User resource types refer to the various memory types that may be involved with process execution. For example, process private memory 206 includes the data memory, stack or heap memory specific to a process during execution. Local shared memory 208 may include, for example, a memory-mapped file segment that is shared between specific processes.

Shared text memory 210A may include, for example, text that is shared by identical copies of programs executing in a computer system (i.e., such global shared memory is not specific to any process or groups of processes). Likewise, shared library memory 210B may include, for example, certain libraries of code that are shared by all processes executing in a computer system.

As shown in FIG. 2, different segments of private memory 206 may be assigned to different MRGs, such as MRGs 220, 222 and 224. These different private memory fragments may be created by different processes, for example.

As mentioned, the paradigm of grouping memory in different MRGs has been confined to private memory thus far. Partitioning private memory is less complicated than partitioning local shared memory or partitioning global shared memory since each private memory segment (or object) is affiliated with only one process. As currently implemented, it is not possible to extend memory resource grouping to either local shared memory or global shared memory.

To elaborate, consider the situation in FIG. 3. In FIG. 3, process 302 and process 304 are affiliated with respective MRGs 352 and 354. These process affiliations are represented by private affiliations 312 and 314 respectively. The private affiliations are typically assigned to the processes, e.g., by the system administrator or by inheritance during forking (i.e., the child process inherits the same affiliation as the parent process after being forked in the unix environment).

Process 302 creates three private segments 302A, 302B, and 302C during execution. These private segments are automatically affiliated (by the operating system) with the MRG 352 since there is a private affiliation 312 between process 302 and MRG 352. Accordingly, the memory required by memory segments 302A, 302B, and 302C are allocated only from MRG 352.

Likewise, process 304 creates three private segments 304A, 304B, and 304C during execution. These private segments are automatically affiliated (by the operating system) with the MRG 354 since there is a private affiliation 314 between process 304 and MRG 354. Accordingly, the memory required by memory segments 304A, 304B, and 304C are allocated only from MRG 354. Logically speaking, each of process 302 and process 304 has been partitioned to use only the memory associated with the MRG to which it is affiliated for its private memory needs (i.e., MRG 352 for process 302 and MRG 354 for process 304).

Now consider the shared memory situation. If process 302 and process 304, which are affiliated with different MRGs for their private memory needs, need to share a memory segment (i.e., either local shared memory or global shared memory), a methodology needs to exist to allow these processes to share a memory segment across the logical partitions that divide the MRGs. Furthermore, a methodology needs to be developed to allow a shared memory segment (either local or global) to be shared by processes even if the process that created that shared memory segment detaches from it or no longer exists. This is unlike the situation with a private memory segment wherein the private memory segment is deallocated if it is detached from its creator process or if its creator process terminates.

Additionally, the sharing needs to be transparent from the load-balancing perspective in that it is important to be able to move a process from one MRG to another MRG without undue restriction even if that process shares a memory segment with another process that may be assigned to any of the MRGs. For example, requiring that processes sharing a memory segment to be assigned to the same MRG would ensure that these processes can share the same memory segment but would impose an undue restriction on the ability to move a process from one MRG to another MRG during load balancing. For backward compatibility reasons, the methodology also needs to work within the existing application semantics and memory resource grouping infrastructure.

SUMMARY OF INVENTION

The invention relates, in one embodiment, to a method for allocating memory associated with a local shared memory segment to facilitate execution of a first process. The method includes automatically allocating memory associated with a first MRG to the local shared memory segment if the local shared memory segment is created by the first process. The first MRG is associated with a first local shared affiliation that involves the first process. The method also includes automatically allocating memory associated with a second MRG to the local shared memory segment if the local shared memory is created by a second process different from the first process. The second MRG is associated with a second local shared affiliation that involves a second process.

In another embodiment, the invention relates to a method for allocating memory associated with a global shared memory segment to facilitate execution of a first process. The method includes ascertaining a global shared affiliation having the same memory resource type as a memory resource type associated with the global shared memory segment, with the global shared affiliation involving a first MRG. The method further includes allocating memory from the first MRG to the global shared memory segment to facilitate execution of the first process.

In yet another embodiment, the invention relates to a method for allocating memory associated with a global shared memory segment to facilitate execution of a first process. The method includes ascertaining a first global shared affiliation involving a first MRG. The first global shared affiliation has the same memory resource type as a memory resource type associated with the global shared memory segment. The first global shared affiliation is different from other global shared affiliations that have the same memory resource type as the memory resource type associated with the global shared memory segment by virtue of an association indicia that is also associated with the first process. The method includes allocating memory from the first MRG to the global shared memory segment to facilitate execution of the first process.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 shows, in accordance with an embodiment of the present invention, some example primitives that may be employed to manage memory sharing.

DETAILED DESCRIPTION OF EMBODIMENTS

Figure 1A:
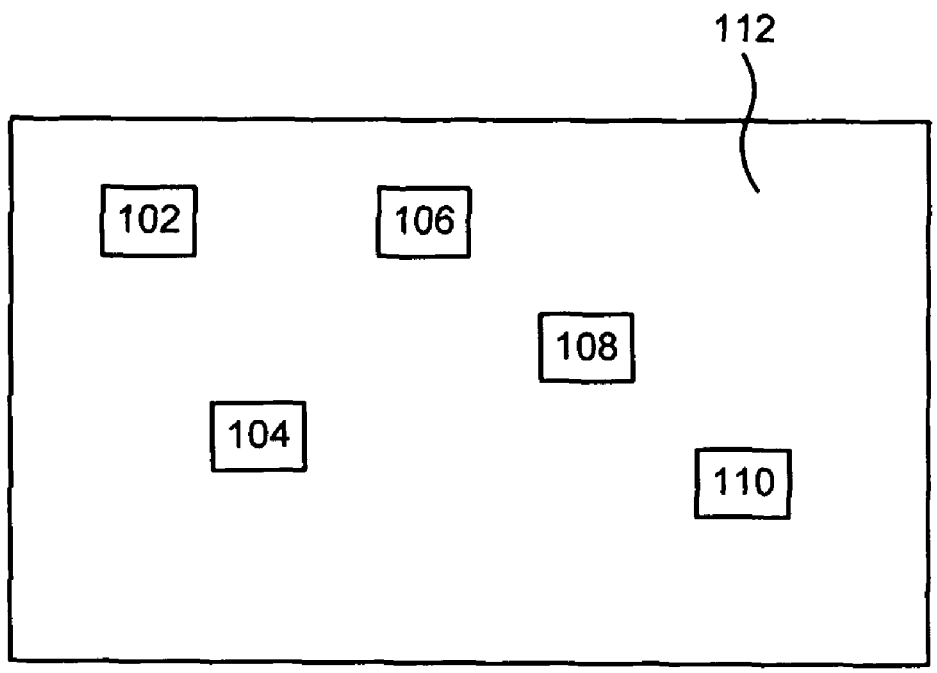
FIG. 1A shows multiple processes sharing the memory space of a computer system.
Figure 1B:
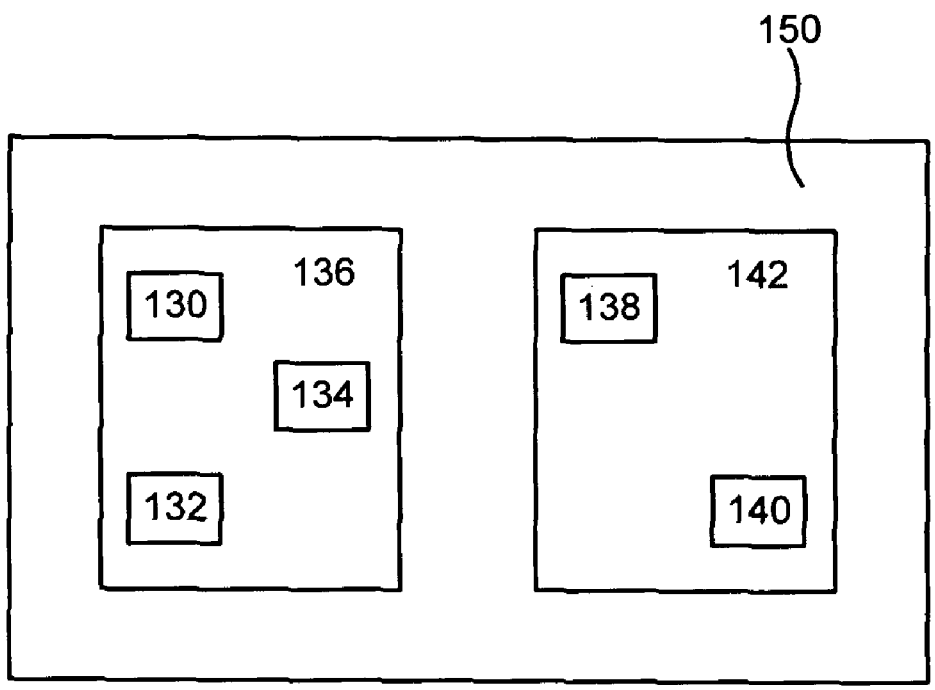
FIG. 1B illustrates the concept of memory resource groups.
Figure 2:
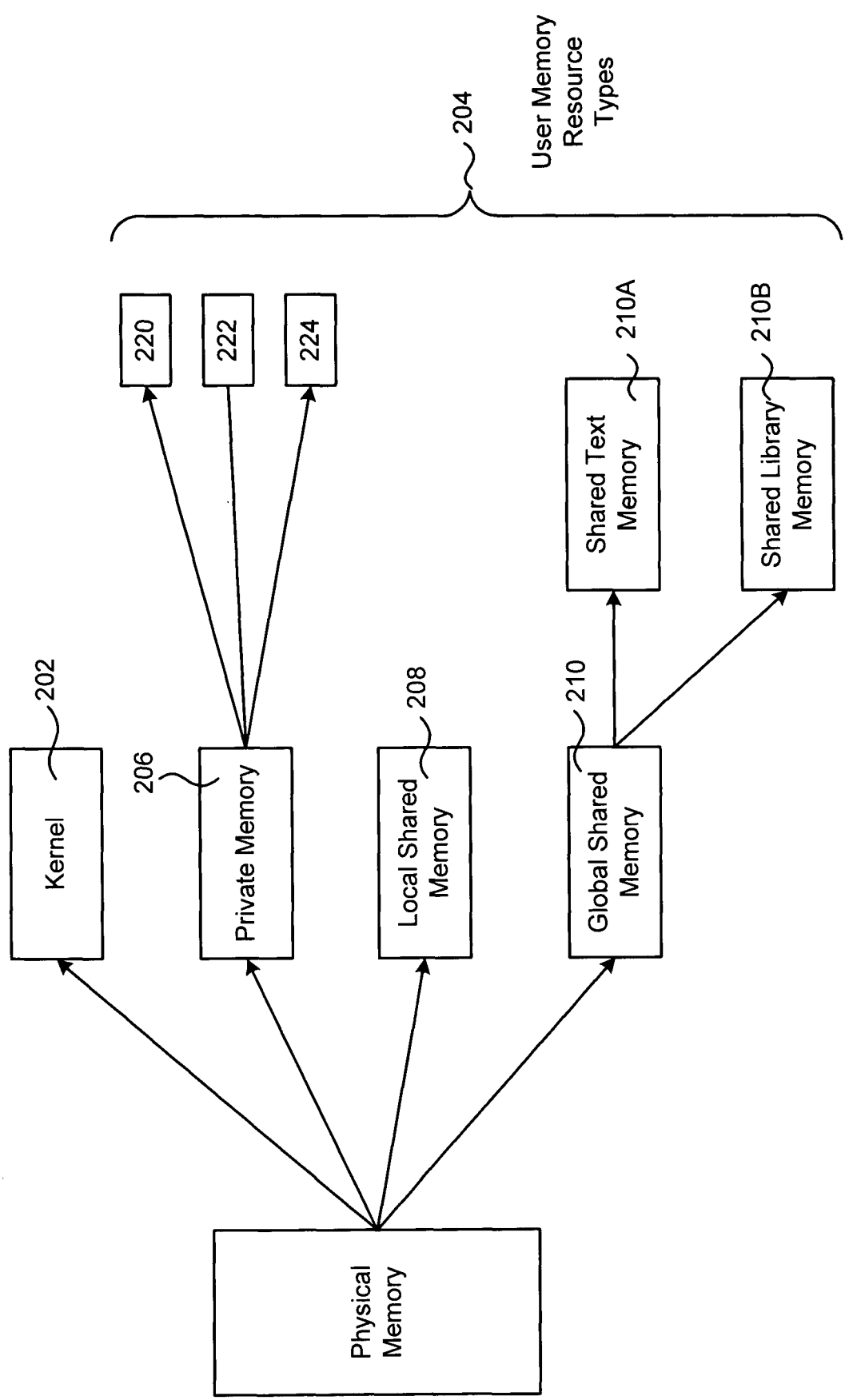
FIG. 2 shows the various memory resource types that may exist in physical memory.
Figure 3:
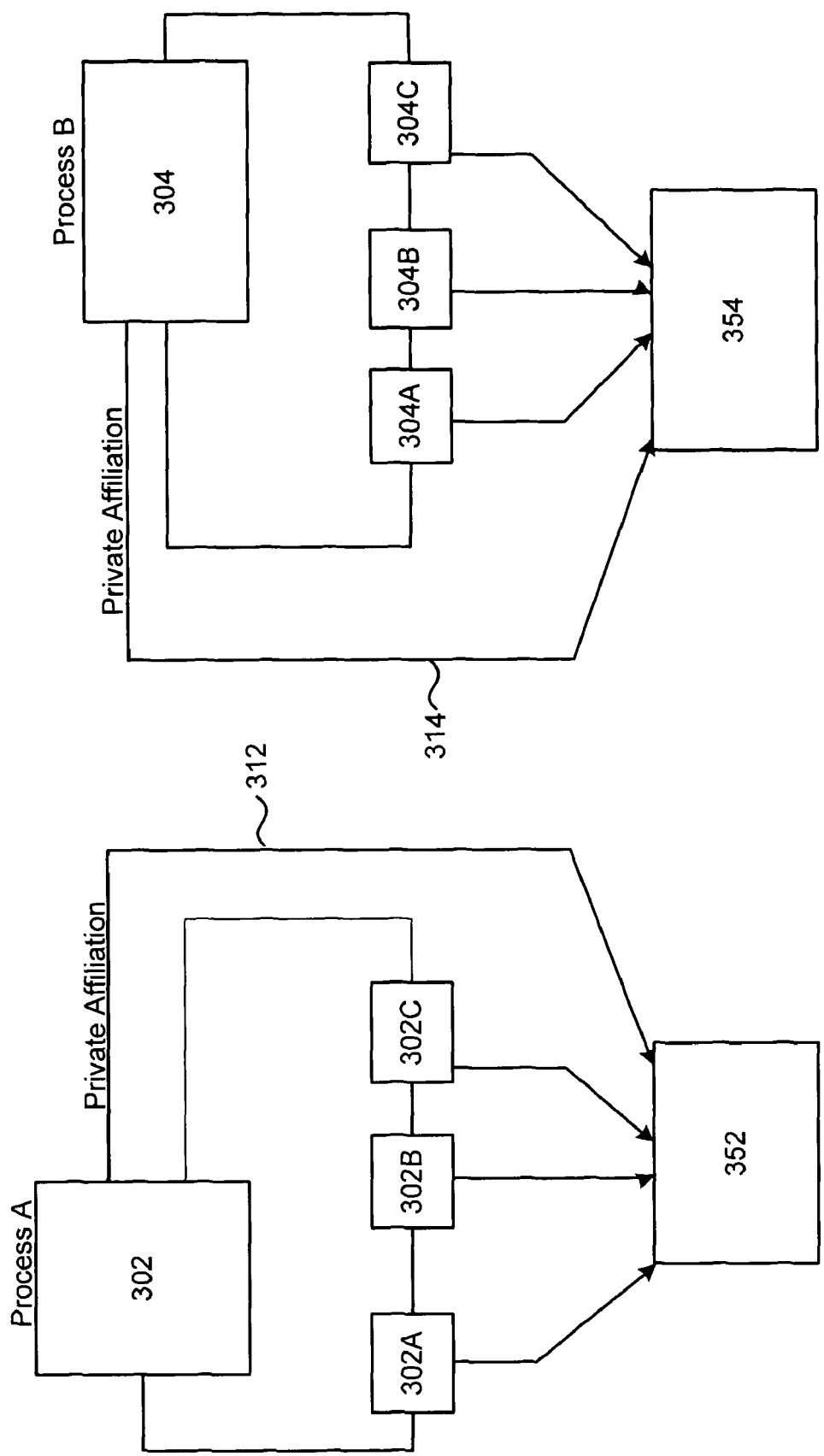
FIG. 3 shows the sharing of private memory of processes using memory resource groups.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general purpose computer and/or a dedicated computing device when appropriately programmed and may include a combination of a computer/computing device and dedicated/programmable circuits adapted for the various tasks pertaining to embodiments of the invention.

In accordance with embodiments of the present invention, there are provided methods and arrangements for allowing processes to share local shared memory segments and to share global shared memory segments without impacting the ability to partition processes among MRGs and without placing undue restrictions on the ability to load-balance among MRGs. In an embodiment, if a process creates a local shared memory segment, that local shared memory segment is allocated memory from the MRG that is associated with the creator process.

In the context of local shared memory, the association between a process and a MRG is governed, as will be seen, by a shared affiliation that is established for the process either by inheritance or by the operator of the computer system.

To elaborate, when the computer system starts up, the first process that executes may employ memory from a default MRG. This default MRG occupies the entire available physical memory until another MRG is created (e.g., by the system administrator), causing the two MRGs to share the available physical memory. Furthermore, processes that startup may be defaulted to the default MRG unless they are reassigned (via the affiliation mechanism) to another MRG. With respect to inheritance, a child process that forks from a parent process inherits the affiliations of the parent process. Forking is a concept well known in unix and will not be discussed in details herein.

Further, note that affiliations are type-specific, i.e., an affiliation is specific as to the memory resource type. For example, a process may have its private affiliation with one MRG and a shared affiliation with another MRG. Global shared memory, on the other hand, is not specific to any process since by definition, the global shared memory may be shared by any process. Accordingly, there exists, as will be shown later herein, a global shared affiliation for each global shared memory resource type. However, there is no creator process for a global shared memory segment in the same sense that there is a creator process for a local shared memory segment.

In the current example, if a second process wishes to share that local shared memory segment, memory for such sharing by the second process is allocated not from the MRG associated with (by virtue of the local shared affiliation mechanism) that second process but from the MRG associated with (again, by virtue of the local shared affiliation mechanism) the process that created that local shared memory segment. In this manner, many different processes having shared affiliations with different MRGs can still share a particular local shared memory segment, and all memory required for such sharing is allocated from the MRG associated with (by virtue of the local shared affiliation mechanism) the process that created that shared memory segment. Furthermore, these sharing processes may be moved among MRGs of the computer system (e.g., for load balancing) without impacting the ability to continue sharing the local shared memory segment.

If the process that created a local shared memory segment detaches from that local shared memory segment or terminates, the local shared memory segment is considered to be orphaned. The orphan concept allows sharing to continue and, as will be discussed, load-sharing to occur. In this case, the orphaned local shared memory segment is allowed to continue to use the memory of the MRG that is affiliated with the process that created that local shared memory segment.

Furthermore, embodiments of the invention provide a facility to allow the system administrator to ascertain the orphaned local shared memory segments in a given MRG, as well as a facility to allow the system administrator to move orphaned local shared memory segments from one MRG to another MRG for load-balancing purposes.

With respect to global shared memory, since a global shared memory resource type may be shared by any process and is not affiliated with any particular process or group of processes, the global shared memory segments of that resource type may be associated with (by virtue of a global shared affiliation) a particular MRG. Any process may share a global shared memory segment by attaching to it, irrespective of its own private and/or local shared affiliations. Memory required for such sharing is allocated out of the MRG affiliated with (by virtue of the global shared affiliation mechanism, which is created by the operator of the computer system) the resource type to which the global shared memory segment belongs. The same facilities that exist to allow a process to move orphaned local shared memory segments among MRGs may be employed to manage the global shared memory.

Figure 4:
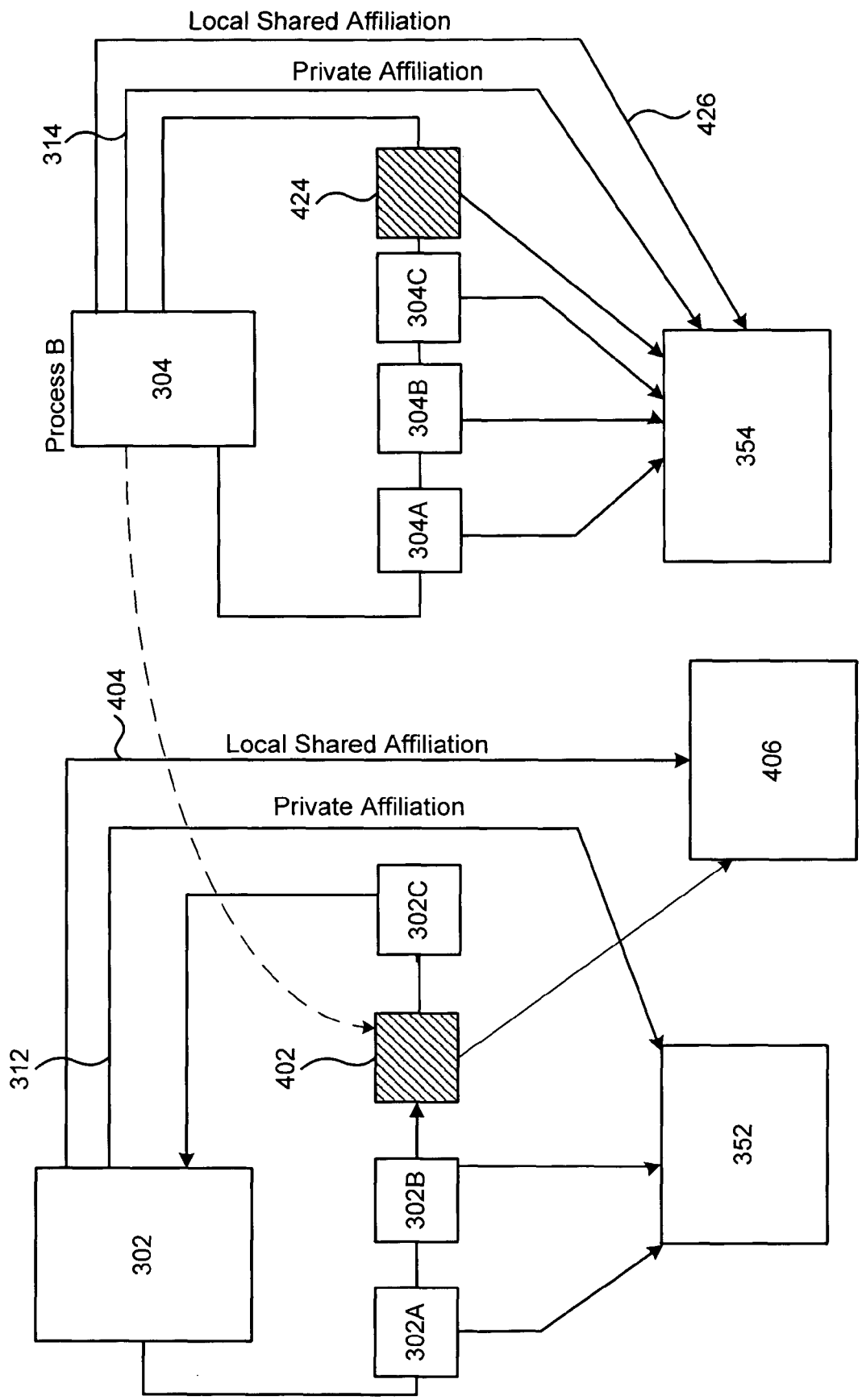
FIG. 4 shows, in accordance with an embodiment of the present invention, an example arrangement whereby a plurality of processes can share a local shared memory segment.

The invention may be better understood with reference to the figures and discussions herein. FIG. 4 shows, in accordance with an embodiment of the present invention, an example arrangement whereby processes 302 and 304 can share a local shared memory segment 402. As before, process 302 creates three private memory segments 302A, 302B, and 302C, which are affiliated with MRG 352 since MRG 352 has an affiliation (by virtue of the private affiliation 312) with process 302. Again, process 304 creates three private memory segments 304A, 304B, and 304C, which are affiliated with MRG 354 since MRG 354 has an affiliation (by virtue of the private affiliation 314) with process 304.

FIG. 4 further shows a local shared memory segment 402, representing a local shared memory segment that is created by process 302. Since MRG 406 is associated with local shared affiliation 404, which shows the affiliation with (or involves) process 302, memory allocation is made for local shared memory segment 404 from MRG 406.

Likewise, FIG. 4 further shows a local shared memory segment 424, representing a shared local memory segment that is created by process 304. Since MRG 354 is associated with local shared affiliation 426, which shows the affiliation with (or involves) process 304, memory allocation is made for local shared memory segment 424 from MRG 354.

If local shared memory segment 402 is configured to be shared between creator process 302 and process 304, process 304 may share that shared local memory segment 402. However, memory allocation for such sharing by process 304 is performed using the memory of MRG 406, i.e., the MRG associated with the local shared affiliation involving the process that originally created the local shared memory segment. Note that this is the case despite the fact that process 304 has a local shared affiliation 426, which affiliates process 304 with MRG 354 for local shared memory. The memory allocation to accommodate the sharing by process 304 of local shared memory segment 402 is not made from MRG 354 since MRG 354 is not associated with the local shared affiliation that involves the creator process of local shared memory segment 402 (i.e., creator process 302).

Figure 5:
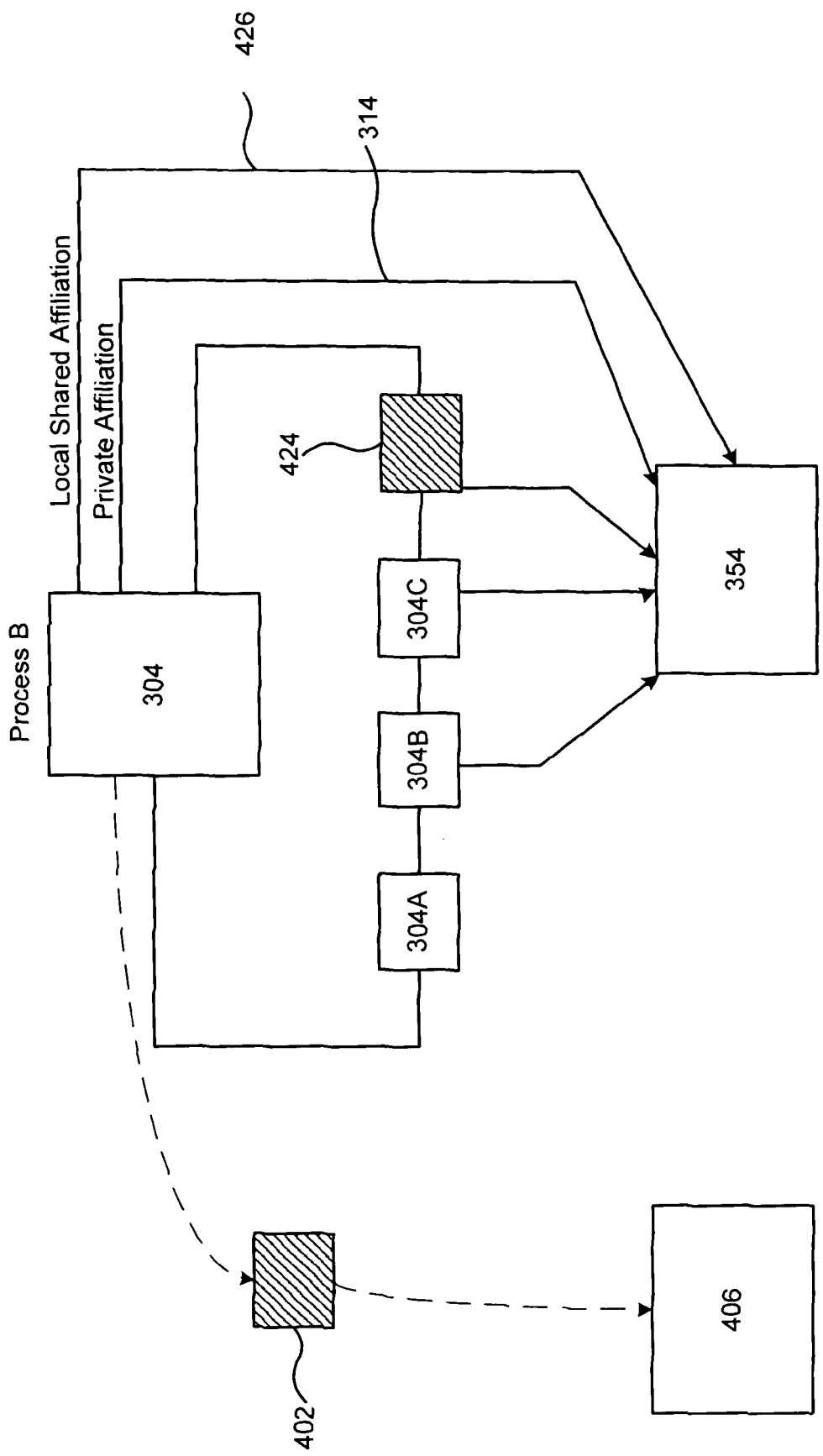
FIG. 5 shows, in accordance with an embodiment of the present invention, an example arrangement whereby a plurality of processes can still share a local shared memory segment even if the originator process has detached itself from the local shared memory segment it created.

Other processes may share local shared memory segment 402 in the same manner and have the memory allocation therefor performed using memory from MRG 406. If process 302 detaches from shared local memory segment 402 or terminates, local shared memory segment 402 continues to exist in MRG 406 and may continue to be shared as an orphaned local shared memory segment among the other processes. This is shown in FIG. 5 in which process 302 has detached itself from local shared memory segment 402.

In an embodiment, a local shared memory segment includes attributes that allows it to be identified as an orphaned memory segment to a primitive (i.e., command) querying about the existence of such orphaned memory segments in a MRG. An application programming interface (API) is provided to extract this information from the kernel. Furthermore, an API is also provided to allow a system administrator to move all orphaned local shared memory segments from one MRG to another MRG (e.g., for load balancing purposes). The linkage between a process sharing an orphaned local shared memory segment and that local shared memory segment is maintained when an orphaned local shared memory segment is moved from one MRG to another MRG, thereby allowing process execution to continue.

In this manner, logical partitioning of processes to different MRGs may be maintained even if these processes share one or more local shared memory segments. Such logical partitioning makes it possible to guarantee a certain process or group of processes a certain amount of physical memory during execution. Additionally, the orphan concept allows sharing to continue even if the process that created a local shared memory segment subsequently terminates or detaches from that local shared memory segment. Furthermore, since the linkage between a process and a local shared memory segment is maintained if the process is moved from one MRG to another MRG, the ability of the computer system to load balance among MRGs is not impacted.

Figure 6:
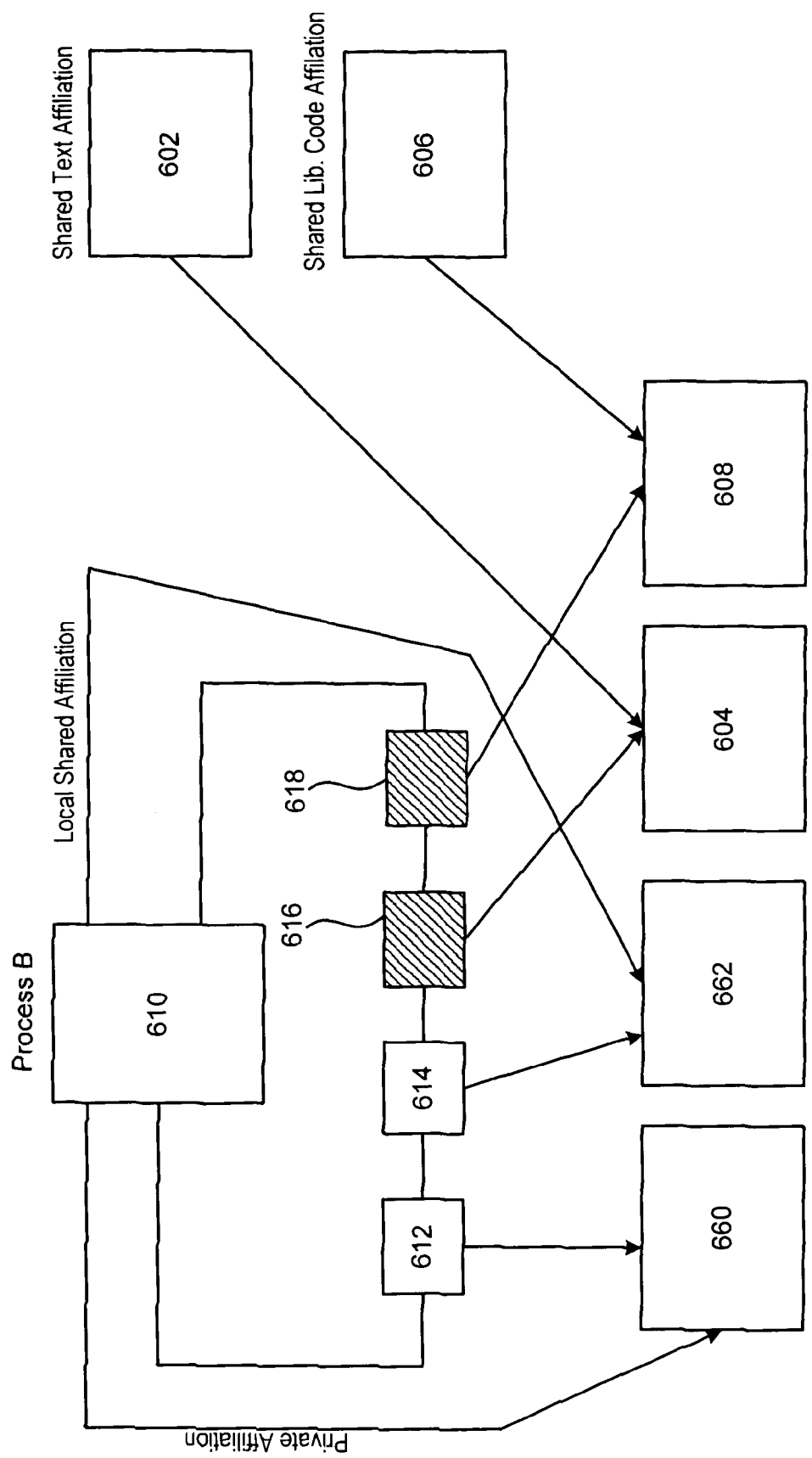
FIG. 6 shows, in accordance with an embodiment of the present invention, an example arrangement in which global shared affiliations have been designated for the shared text memory resource type and for the shared library code memory resource type.

FIG. 6 shows, in accordance with an embodiment of the present invention, an example arrangement in which global shared affiliations have been designated for the shared text memory resource type (which is a global shared memory type) and for the shared library code memory resource type (which is also a global shared memory type). Since a global shared memory resource type may be shared by any process and is not affiliated with any particular process or group of processes, the global shared memory segments of that resource type may be affiliated with a particular MRG. A global shared affiliation of this nature is set up during system startup (by the system administrator, for example) for each global shared memory resource type. These global shared affiliations are shown in FIG. 6 by shared text affiliation 602 to a MRG 604 and shared library code affiliation 606 to a MRG 608.

Thereafter, a process such as process 610 may create a private memory segment 612 and a local shared memory segment 614 in the manner described earlier. Process 610 may also create a global shared memory segment 616 that consumes the shared text memory resource type. The allocation for this sharing is made from MRG 604 since there is an affiliation of the same memory resource type text (i.e., shared text affiliation 602) to MRG 604.

Process 610 may also create a global shared memory segment 618 that consumes the shared library code memory resource type. The allocation for this sharing is made from MRG 608 since there is an affiliation of the same memory resource type library code (i.e., shared library code affiliation 606) to MRG 608.

In the example of FIG. 6, it is assumed that all shared text objects are treated as a single entity for the purpose of affiliating with a MRG (e.g., all shared text objects are affiliated as a single entity to MRG 604 by shared text affiliation 602). In another embodiment, it may be advantageous to partition a global shared memory resource type (whether text or library code) among different MRGs to guarantee a particular global shared memory object a certain amount of physical memory during execution. In this case, the method not only ascertains the global affiliation of the same memory type but also another association indicia to decide on the particular resource group to allocate memory from.

For example, if two different shared text objects (e.g., binary code A and binary code B) are affiliated with two different MRGs (e.g., MRG 1 and MRG 2 respectively), the decision regarding which MRG to employ for allocation when a process creates a shared text memory segment involves not only ascertaining the global affiliation of the memory type text but also involves at least one other association criteria. This is because ascertaining only the global affiliation of the memory type text would result in two possible answers: MRG1 and MRG2. The name of the application may be the other association criteria. For example, if it is desired that any process sharing any or all of binary code A be allocated memory from MRG1, the method applies the additional association criteria (i.e., the identity of binary code A) to resolve the MRG from which allocation should be made.

As mentioned, an API may be provided to facilitate moving orphaned local shared memory segments among MRGs. The same API and facility may be employed to facilitate moving global shared memory objects among MRGs. For example, the system administrator may employ a primitive to move all shared text segments from one MRG to another MRG.

FIG. 7 shows some example primitives that may be employed to manage memory sharing. MRG_CREATE is employed to create a MRG. MRG_REMOVE is employed to remove a MRG. MRG_GET_ATTRIBUTE is employed to get attributes of a MRG. Attributes include, for example, the current size and import/export capabilities of a given MRG. MRG_SET_ATTRIBUTE is employed to set attributes of a MRG. MRG_GET_STATS is employed to get various memory management related statistics of a MRG (available memory, number of members, number of page-faults, number of deactivated-processes, etc.).

MRG_GET_PROC_AFF is employed to obtain the MRG affiliations of a process (for private memory and local shared memory). MRG_SET_PROC_AFF allows a system administrator or an operator to change the MRG affiliations for a process (e.g., changing the inherited or default affiliations of a process). MRG_GET_OBJ_AFF allows a system administrator or an operator to obtain the current affiliations of global shared memory, such as shared text and shared library code. MRG_SET_OBJ_AFF allows a system administrator or an operator to change the global shared memory affiliations (shared text and/or shared library code) as well as re-locate orphaned local shared memory objects from one MRG to another. MRG_NUM_OBJ allows a system administrator or an operator to obtain the number of objects associated with a MRG. The objects returned by MRG_NUM_OBJ are sorted by memory type (e.g., private, local shared, global text, global library code, etc.) and for local shared memory segments, whether they are orphaned.

As can be appreciated from the foregoing, the invention provides various techniques for permitting processes to be partitioned in different MRGs to share local and global shared memory. In combination with the prior art management of private memory partitioning, a complete solution now exists for partitioning memory for all user memory types (private, local shared, and global shared) within the existing MRG infrastructure. No change to the unix semantics is required, thereby rendering the inventive techniques fully backward compatible with existing unix applications. The affiliations created permit full load-balancing capabilities with respect to the processes. Embodiments of the invention permit the sharing to continue even if the process that creates the local shared memory segment detaches or terminates. Furthermore, facilities are provided to allow the system administrator, to assign affiliations, to query for orphaned local shared memory segments, and to load balance by moving local orphaned local memory segments or global shared memory segments among MRGs.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a computer system, a local shared memory allocation method, comprising:
   dividing physical memory into logical memory resource groups (MRGs) so that physical memory portions assigned to the corresponding MRGs are isolated from one another, wherein a first process has a first local shared affiliation with a first of the MRGs, and a second process has a second local shared affiliation with a second of the MRGs, the second MRG having no affiliation with said first process;
   automatically allocating, in the computer system, memory for use by the first process to a local shared memory segment created by the second process, wherein the memory allocated to the local shared memory segment is from the second MRG by virtue of the second local shared affiliation of the second process with the second MRG, wherein said allocated memory is allocated from said second MRG to said local shared memory segment if said local shared memory segment is created by said second process irrespective of whether said first process has a shared local affiliation with any other MRG.

2. The method of claim 1 wherein said first shared local affiliation is associated with said first process through inheritance.

3. The method of claim 1 wherein said first shared local affiliation if associated with said first process through reassignment.

4. The method of claim 1 wherein said local shared memory segment is configured to be employed by said first process even after said second process terminates.

5. The method of claim 1 wherein said local shared memory segment is configured to be employed by said first process even after said second process detaches from said local shared memory segment.

6. A method for allocating memory to a process, the memory associated with a global shared memory segment, comprising:
   dividing physical memory in a computer system into logical memory resource groups (MRGs);
   ascertaining, in the computer system, a first global shared affiliation having a same memory resource type as a memory resource type associated with said global shared memory segment, said first global shared affiliation involving a first memory resource group (MRG), and said first global shared affiliation being different from other global shared affiliations that have the same memory resource type as said memory resource type associated with said global shared memory segment, wherein at least one of said other global shared affiliations involves a second of the MRGs different from said first MRG;
   allocating, in the computer system, memory from said first MRG to said global shared memory segment; and
   using an association indicia to decide to allocate the memory from the first MRG instead of the second MRG to said global shared memory segment.

7. The method of claim 6 wherein said global shared memory segment represents a shared text segment.

8. The method of claim 6 wherein said global shared memory segment represents a shared library segment.

9. The method of claim 6 wherein said memory is allocated from said first MRG to said global shared memory segment when said process is associated with a shared local affiliation that involves any other MRG.

10. The method of claim 6 wherein said memory is allocated from said first MRG to said global shared memory segment to facilitate execution of said process when said process is associated with a private affiliation that involves an MRG different from said first MRG.

11. A method comprising:
   dividing physical memory in a computer system into logical memory resource groups (MRGs), wherein a process has a first local shared affiliation with a first of the MRGs;
   creating, by the process in the computer system, a global shared memory segment;
   ascertaining, in the computer system, a first global shared affiliation involving the first MRG, said first global shared affiliation having the same memory resource type as a memory resource type associated with said global shared memory segment, said first global shared affiliation being different from other global shared affiliations that have the same memory resource type as said memory resource type associated with said global shared memory segment, wherein at least one of said other global shared affiliations involves a second of the MRGs different from said first MRG, the method further comprising;
   allocating, in the computer system, memory from said first MRG to said global shared memory segment; and
   using an association indicia to decide to allocate the memory from the first MRG instead of the second MRG to said global shared memory segment.

12. The method of claim 11 wherein said association indicia is an identification of a specific application.

13. The method of claim 11 wherein said global shared memory segment represents a shared text segment.

14. The method of claim 11 wherein said global shared memory segment represents a shared library segment.

15. An article of manufacture comprising a program storage medium having computer readable code embodied therein, said computer readable code being configured to allocate memory to a first process, wherein physical memory is divided into logical memory resource groups (MRGs), and the first process has a first local shared affiliation with a first of the MRGs, comprising:

computer-implemented code for automatically allocating memory from a second of the MRGs to a local shared memory segment created by a second process different from the first process, said local shared memory segment being accessible by the first process, said second MRG having a second local shared affiliation with said second process, said second MRG having no affiliation with said first process, wherein dividing of the physical memory into the logical MRGs causes physical memory portions assigned to the corresponding MRGs to be isolated from one another, and wherein said allocated memory is allocated from said second MRG to said local shared memory segment if said local shared memory segment is created by said second process irrespective of whether said first process has a shared local affiliation with any other MRG.

16. The article of manufacture of claim 15 further comprising computer readable code for enabling said local shared memory segment to be continued to be employed by said first process even after said second process terminates.

17. The article of manufacture of claim 15 further comprising computer readable code for enabling said local shared memory segment to be continued to be employed by said first process even after said second process detaches from said local shared memory segment.

18. An article of manufacture comprising a program storage medium having computer readable code embodied therein, said computer readable code being configured to allocate memory to a process, the memory associated with a global shared memory segment, comprising:

computer readable code for ascertaining a first global shared affiliation having a same memory resource type as a memory resource type associated with said global shared memory segment, said first global shared affiliation involving a first memory resource group (MRG), wherein an MRG is a logical block of physical memory, and said first global shared affiliation being different from other global shared affiliations that have the same memory resource type as said memory resource type associated with said global shared memory segment, wherein at least one of said other global shared affiliations involves a second of the MRGs different from said first MRG;

computer readable code for allocating memory to the process from said first MRG to said global shared memory segment; and computer readable code for using an association indicia to decide to allocate the memory from the first MRG instead of the second MRG to said global shared memory segment.

19. The article of manufacture of claim 18 wherein said global shared memory segment represents a shared text segment.

20. The article of manufacture of claim 18 wherein said global shared memory segment represents a shared library segment.

* * * * *